J. A. GRAY.
CAN END LINER CUTTING AND ASSEMBLING MACHINE.
APPLICATION FILED MAR. 8, 1917.

1,299,170.

Patented Apr. 1, 1919.
3 SHEETS—SHEET 2.

WITNESS.

J. D. Thornburgh.

INVENTOR.
James A. Gray
BY
ATTORNEY.

J. A. GRAY.
CAN END LINER CUTTING AND ASSEMBLING MACHINE.
APPLICATION FILED MAR. 8, 1917.
1,299,170.
Patented Apr. 1, 1919.
3 SHEETS—SHEET 3.
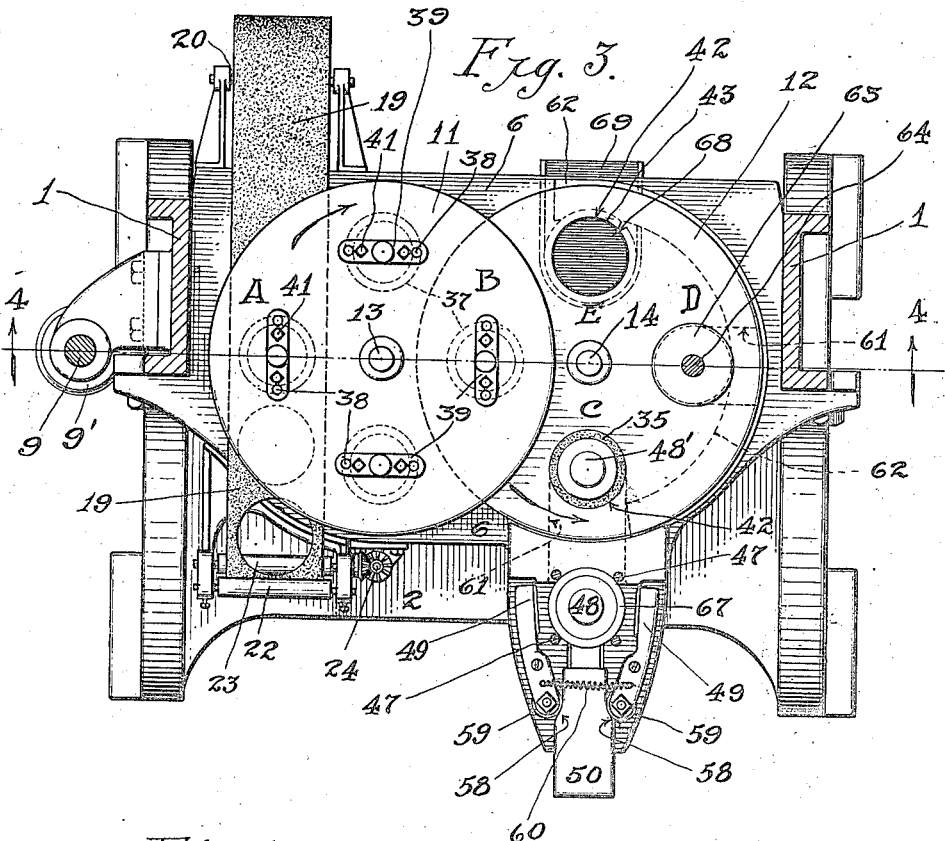
WITNESS.
J. D. Thornburgh.
INVENTOR.
James A. Gray
BY
N A Acker
ATTORNEY.

UNITED STATES PATENT OFFICE.

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

CAN-END-LINER CUTTING AND ASSEMBLING MACHINE.

1,299,170. Specification of Letters Patent. Patented Apr. 1, 1919.

Application filed March 8, 1917. Serial No. 153,309.

*To all whom it may concern:*

Be it known that I, JAMES A. GRAY, a citizen of the United States, residing at the city and county of San Francisco and State of California, have invented certain new and useful Improvements in Can-End-Liner Cutting and Assembling Machines, of which the following is a specification.

The present invention relates to an apparatus for cutting ring liners from a flat sheet of liner material as for example, paper and applying the liner so cut to the flange of a positioned can end.

The invention comprises, broadly, co-acting instrumentalities for feeding a web or blank or other form of sheet liner material to a position for cutting a ring liner therefrom; for cutting the ring liner preferably at a single operation and depositing the same within one member of a pair of co-acting composite dies; for carrying the ring liner in said die member to transfer position; for transferring the ring liner from said die member to a transfer member; for positioning a flanged can end in axial alinement with the cut ring liner and for carrying the liner and the axially alined can end to an assembling station; and finally for assembling the liner and the can end at said station. The various interconnected working instrumentalities are automatic in their operation and are so timed relative to each other as to come into action at the proper time for carrying out the various steps incident to the cutting of the ring liner and the applying of the same to the flange of the can end.

As is well known in the art the gasket ring liners used for establishing an air-tight seal between the ends and the body of a can of the so-called sanitary type are of a very fragile nature and must be carefully handled through all the steps intervening between the cutting of the ring liner and its assembling with the can end. It is of the utmost importance to insure absolute axial alinement between the cut ring liner and the can end, to the flange of which the liner is to be applied, in order to avoid tearing or distorting the liner during its application. The object of the present invention, therefore, is to provide a machine of the type and for the purpose described in which the ring liner is securely held at all times between the cutting thereof and the positioning of the same upon the can end; and in which the ring liner and the can end are positively and accurately alined by being held within one and the same holding means so that no variation in said alinement can occur before the liner is supplied to the flange of the can end.

In the following description the invention is described in its preferred form and is so illustrated in the accompanying drawings. It is to be understood, however, that changes may be made in the form and construction of the device without departing from the spirit of the invention, and it is therefore my wish to be understood as claiming the invention, in the claims hereto appended, as broadly as the state of the art will permit.

In order to comprehend the invention, reference should be had to the accompanying sheets of drawings wherein:

Fig. 3 is a sectional plan view taken on the line 3—3 of Fig. 1 and viewed in the direction of the arrows.

Fig. 4 is a detailed sectional elevation taken on the line 4—4 of Fig. 3 and viewed in the direction of the arrows.

Figure 1:
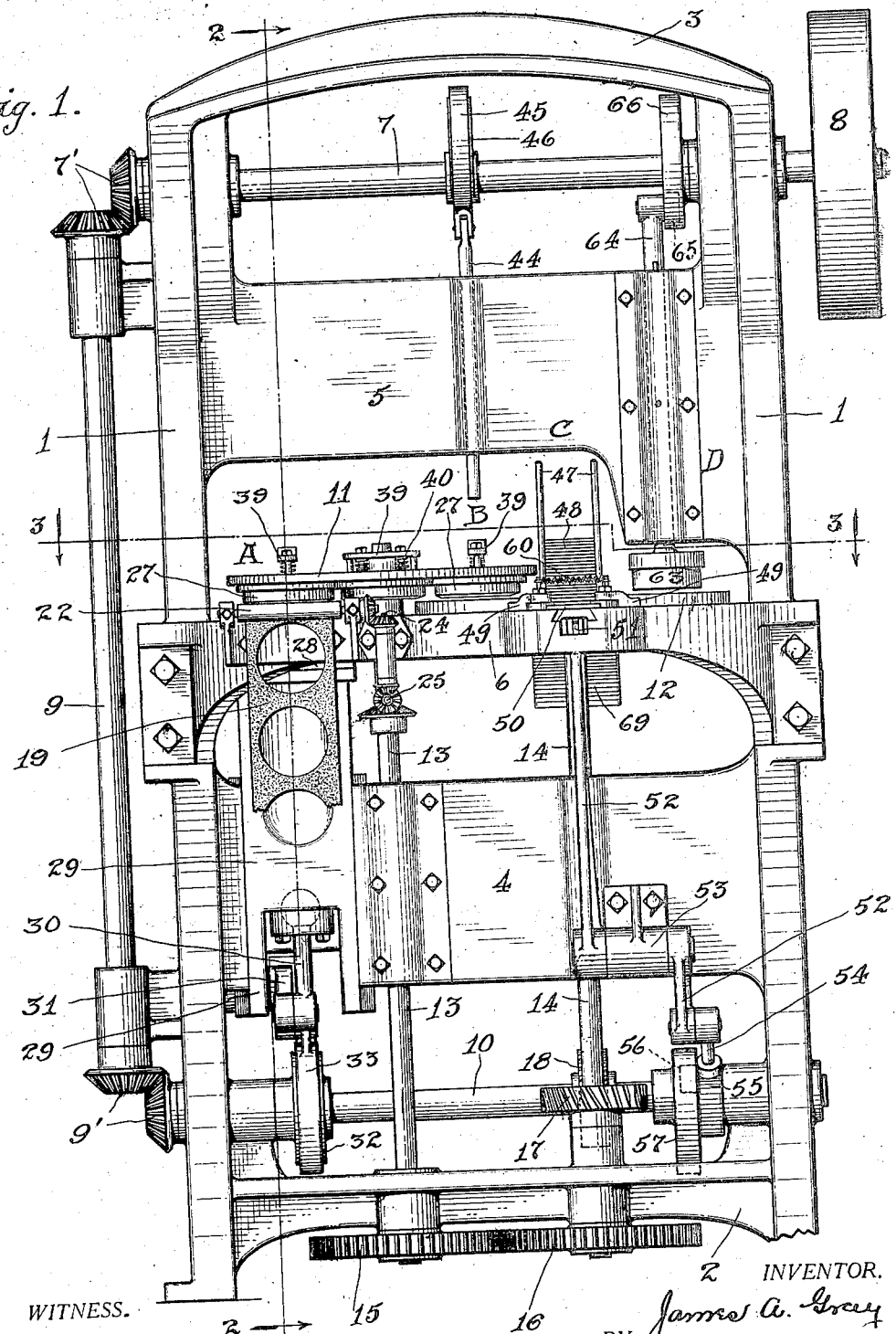
Figure 1 is a front elevation of the machine showing the complete drive mechanism.

In the drawings, the reference numerals 1 designate the spaced upright side members of a suitably constructed frame, which side members are united together and held in spaced relation by a cross member 2 at their lower portions, a similar cross member 3 at their upper portions, and between said cross members by vertically disposed webs 4 and 5, the former below and the latter above a bed or table, and by such a horizontally disposed bed or table 6.

Power for operating the moving parts of the machine is applied to a horizontal shaft 7, Fig. 1 of the drawings, rotatably mounted in the upper portion of the frame, by means of a belt pulley 8 secured to one end thereof. It is to be understood however, that any suitable form of driving means may be employed, the form herein shown being merely that which is preferred. The horizontal drive shaft 7 transmits its rotary motion through bevel gears 7', a vertical shaft 9, and a second pair of bevel gears 9', to a second horizontal shaft 10 suitably journaled in the lower portion of the frame. The shafts 7 and 10 are so related that they rotate in unison.

Mounted above the table 6 are two horizontally disposed turrets 11 and 12, Figs. 1, 3 and 4 of the drawings, carried upon the upper ends of vertically disposed shafts 13 and 14 respectively. These shafts are suitably journaled in the frame web 4 and the lower cross frame member 2, and carry upon their lower ends intermeshing gears 15 and 16 respectively, Fig. 1 of the drawings. The shaft 14 also carries a mutilated worm gear 17, Figs. 1 and 2, adapted to mesh with a correspondingly formed worm 18 mounted upon the lower transverse driving shaft 10, the result being that the vertical shafts 13 and 14, and the respective turrets 11 and 12 carried thereby, are rotated intermittently at the same speed and in opposite directions. The turret 11 shall hereafter be referred to as the transfer turret, and the turret 12 as an alining turret.

Figure 2:
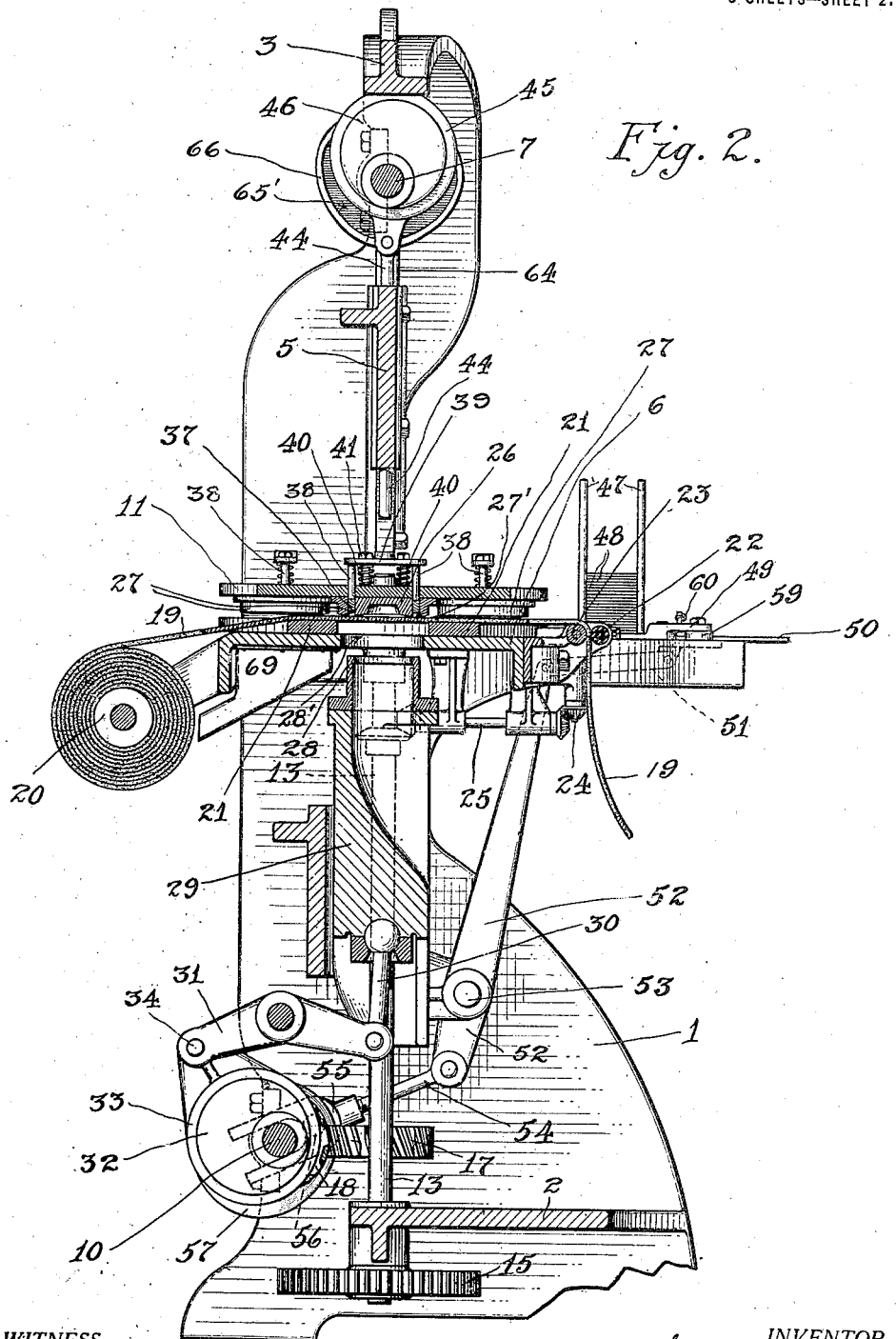
Fig. 2 is a vertical transverse section taken on the line 2—2 of Fig. 1 and viewed in the direction of the arrows.

The station at which the ring liners are cut is designated by the reference letter A in Figs. 1, 3 and 4 of the drawings. At this point a web of ring liner material 19, carried upon a spool 20, Fig. 2 is led horizontally across above the table 6 and below the transfer turret 11, suitable guides 21 being provided for this purpose. At the front of the machine, the web 19 is passed between a pair of feed rollers 22 and 23, Figs. 2 and 3 of the drawings, the roller 23 being driven through a vertical shaft 24 and a horizontal shaft 25, Figs. 1 and 2 of the drawings, from the vertical turret shaft 13, said shafts being connected as illustrated by suitable bevel gears. The web 19 is thus advanced the required distance at each step-movement of the transfer turret 11. It is to be understood that the material from which the ring liners are cut may be supplied in the form of flat disks or in other forms, not shown in the drawings, the web form being illustrated as that which is preferred.

The turret 11 carries a plurality of die rings upon its under side, each comprising an inner ring 26, Figs. 2 and 4 of the drawings, and an outer ring 27, the annular space 27' between said rings being equal to the width of the ring liner to be cut. An annular die 28, adapted to coact with said die rings 26 and 27 to cut a ring liner from the web 19, is carried upon the upper end of a vertical die head 29, the latter being slidably mounted within suitable guides carried upon the frame web 4, and actuated by a connecting rod 30, Figs. 1 and 2, a double armed lever 31, and an eccentric 32, the latter being mounted upon the lower drive shaft 10, and having its strap 33 connected with the lever 31 at 34, Fig. 2. The movement of the die head 29 and the turret 11 are so timed that the die 28, rising through an aperture 28' in the table 6, coacts with each pair of annular die rings 26 and 27 carried by said turret at the position A. In the drawings I have shown four of such pairs of die rings upon said turret 11, the latter being intermittently rotated through a series of quarter revolutions, alternating with an equal number of periods of rest, during each of which the die 28 rises to cut a ring liner from the web 19. After each stroke of said die and during the succeeding quarter revolution of the turret 11, the web 19 is advanced by the described mechanism to bring a fresh portion thereof above the die 28.

The ring liner 35 is left within the annular groove 27' between the inner and outer die rings 26 and 27 by the die 28, as shown in Fig. 2 of the drawings, and the inner core or waste blank 36 is allowed to fall through the annular die 28 and the hollow head 29. A stripper ring 37 is carried in said annular groove 27'; said stripper ring being connected by means of a pair of vertically disposed rods 38, Fig. 2, with a cross member 39 above the turret 11, and said cross member and the stripper ring to which it is connected are retained in their uppermost position by means of springs 40 surrounding guide pins 41 upon which said cross member operates.

The ring liner 35 is carried within the annular groove 27' of the die rings to the position B, Figs. 1, 3 and 4 of the drawings, at which position it is removed from said groove. At this position B the turret 11 overlies the alining turret 12. The latter turret is provided with four circular orifices 42, Figs. 3 and 4 of the drawings, each provided with an annular shoulder 43. The step movements of the two turrets 11 and 12 are so timed that at the position B one of the orifices 42 in the turret 12 is in axial alinement beneath the annular groove 27' between one pair of die rings 26 and 27 of the turret 11, and at this position the ring liner 35 is ejected from said groove 27' by the stripper ring 37, and placed within the alined orifice 42 of said turret 12 and allowed to rest upon the annular shoulder 43 thereof. The stripper ring 37 is actuated by means of a vertically disposed rod 44 Figs. 1 and 2 of the drawings slidably mounted in a suitable journal in the upper frame web 5, and connected with the strap 45, of an eccentric 46 mounted upon the upper drive shaft 7. As shown in Figs. 1, 2 and 4 of the drawings the rod 44 is adapted to be depressed upon the cross member 39 by which the stripper ring is carried and as each ring liner is carried to the position B the rod 44 is actuated to depress the stripper ring 37 and to thereby transfer the ring liner from the groove 27' of the die rings 26 and 27 to the orifice 42 of the turret 12.

The turret 12 rotates one quarter of a revolution at a time in the direction of the arrow as shown in Fig. 3 of the drawings. At the position C a can end is placed in axial alinement below the ring liner 35 resting within the orifice 42. A holder 47, Figs. 1, 2 and 3 of the drawings, adapted to contain a stack of can ends 48, is mounted upon an extension of the table 6 adjacent to the turret 12 at the position C. Associated with the lower portion of said holder are a pair of swinging cut-out arms 49, adapted to raise and support the stack of ends 48 within the holder, with the exception of the lowermost end thereof, and a horizontally reciprocating feed slide 50, adapted to remove the freed lowermost can end from the holder after the remainder of the stack of ends therein has been elevated by the cut-out arms 49. The feed slide 50 is reciprocated by means of a connecting rod 51, Figs. 1 and 2 of the drawings, a lever 52, fulcrumed at 53, and connected below said fulcrum with a rod 54, the latter carrying upon its end a yoke 55 adapted to straddle the lower drive shaft 10 and carrying a cam following roller 56, adapted to lie within and follow a groove, not shown, formed in a cam member 57, the latter being mounted upon the drive shaft 10.

The feed slide 50 has formed upon its opposite sides cam surfaces 58, Fig. 3 of the drawings, adapted to engage and actuate rollers 59 carried by the outer ends of the swinging cut-out arms 49, and a spring 60 maintains said rollers in engagement with said cam surfaces. Thus it will be seen that as the feed slide 50 is moved inwardly, the swinging cut-out arms 49 approach each other and are inserted between the lowermost can end and the can end next above, and thereby raise and support said can end next above the lowermost end and the entire stack of ends resting thereupon. The continued inward movement of said feed slide causes its inner end to engage the freed lowermost can end and to push said can end out from beneath the holder 47 and through radial grooves or slots 61 cut in the under side of the turret 12 and leading from the periphery thereof to the circular apertures 42. A can end shown at 48' is thus removed from the holder and placed, at the position C, Fig. 3 of the drawings, within the lower portion of the circular orifice 42 of the turret 12 in axial alinement with the ring liner 35, the latter resting upon the annular shoulder 43 of said orifice. The can end during this transfer from the holder to the turret 12 rests upon the table 6, and during the subsequent rotary movement of said turret 12 said can end is retained in axial alinement with the ring liner 35 by means of a semicircular guide rail 62, Figs. 3 and 4 of the drawings, secured to said table.

The mechanism hereinbefore described for feeding can ends successively into positions in axial alinement with the ring liners delivered to the turret 12 is a preferred form of mechanism, but it is to be understood that other forms, not shown in the drawings, may be used instead thereof, the sole requirement being that as each ring liner is brought to the position C by the turret 12, a can end must be placed in the lower portion of the orifice 42 in axial alinement with said ring liner.

The ring liner 35 and the can end 48' being positioned in axial alinement at the position C, Fig. 3 of the drawings, the next quarter revolution of the turret 12 carries said ring liner and said can end to the position D, where said ring liner and can end are assembled. For this purpose there is provided an annular assembling die 63, Figs. 1 and 4 of the drawings, carried upon a vertically slidable rod 64, suitably journaled upon the upper frame web 5 and carrying upon its upper end a cam following roller 65, Fig. 1, adapted to lie within and follow a cam groove 65', Fig. 2, formed in the face of a cam member 66 fixed upon the upper drive shaft 7. The annular assembling die 63 is adapted to pass through the turret orifice 42, as shown in Fig. 4, and to force the ring liner 35 past the shoulder 43 of said orifice into the flange 67 of the can end 48' axially alined therewith. After the ring liner 35 and the can end 48' have been assembled at the position D, Fig. 3, the turret 12 moves the same to the position E, where the can end with the ring liner applied to the flange thereof is allowed to fall through an aperture 68 in the table 6 and to be discharged through a chute 69 or by any other means not shown in the drawings.

The operation of the machine may be briefly summarized as follows:

At the position A, Figs. 3 and 4 of the drawings, a ring liner is cut from the paper web 19 by the upward movement of the annular cutting die 28, Fig. 4, and deposited in the groove 27' of the upper pair of die rings 26 and 27 of the carrier turret 11. The die 28 then descends out of the sphere of action of the turret 11, and said turret is advanced one-quarter revolution. During this advance of the turret 11, the web 19 is also advanced by the described mechanism to bring a fresh portion thereof in alinement above the cutting die 28. A second ring liner is then cut from said web by the next upward stroke of said die 28. The second quarter revolution of the turret 11 carries the first cut ring liner to the position B, Figs. 3 and 4 of the drawings, and during the period of rest of the turrets 11 and 12 said ring liner 35 is transferred from the turret 11 to the turret 12 by the stripper ring 37, Fig. 4, actuated by the described mechanism, the ring liner being placed upon the annular shoulder 43 of the circular orifice 42 of said turret 12. The turrets are then moved through a third quarter revolution, which carries the ring liner 35 to the position C, Fig. 3. At this position a can end 48′ is removed from the holder 47 by the described means and placed within the orifice 42 of the turret 12 below the annular shoulder 43 thereof, and in axial alinement with the ring liner 35 resting upon said shoulder. The fourth quarter revolution of the turrets carries the ring liner 35 and the axially alined can end 48′ to the position D, Figs. 3 and 4, and during the period of rest of the turrets in this position the ring liner is applied to the flange of the axially alined can end by means of the annular assembling die 63. The fifth quarter revolution of the turrets carries the assembled can end and ring liner to the discharge position E, Fig. 3, where the same are allowed to drop through the aperture 68, and are removed from the machine by any desired means.

In the foregoing description, the machine has been described, and is illustrated in the drawings as constructed to form ring liners from a continuous web of liner material. It is to be understood, however, that the liner material may be supplied to the machine in any other form, as for example, in the well known form of disk blanks, such form not being illustrated in the drawings. Similarly, the turrets 11 and 12 are shown as each having four sets of carrier means and as being moved through quarter revolutions at each step, but it is to be understood that any number of such means may be employed, consistent with structural practicability, the movement of said turrets being timed accordingly. And as before stated, the particular form of can end holder and feeding means described and illustrated is merely that which is preferred.

With this in view, the invention comprises, broadly, means for cutting a ring liner from a suitably formed sheet of liner material, and for carrying the same in a protected position within one member of the cutting device into a position at which said liner is transferred to means for accurately and positively alining a can end with said ring liner preparatory to the applying of said liner to said end; and finally, means for assembling said ring liner and said end while held in positive alinement.

Having thus described the invention what is claimed as new and desired to be secured by Letters Patent is:—

1. In a machine for the described purpose, the combination with mechanism for cutting a ring liner from flat liner material the same comprising spaced cutting members arranged in axial alinement on opposite sides of flat liner material and having relative movement for cutting can end liners therefrom and leaving said cut liners within the control of one of said cutting members, a horizontally movable orificed alining member the orifices of which are provided with ring liner supports, means for transferring the last mentioned cutting member with the cut liner held thereby from the cutting station of the apparatus to a position in axial alinement with the orifice of the alining member, devices for ejecting the cut ring liner into an axially alined orifice of the said alining member, an assembling means and station, and mechanism associated with said alining member for causing the axial alinement of said ring liner and a can end at said assembling station.

2. In an apparatus for the described purpose, the combination of mechanism for cutting a ring liner from flat liner material consisting of opposing liner cutting members arranged in axial alinement and having a relative movement for cutting can end liners from liner material and leaving the same within the control of one of said cutting members, an orificed alining member for receiving the cut ring liner from said last mentioned cutting member, a carrier member for transferring the said cutting member with its cut liner from a cutting station to a position in axial alinement with the orifice of the alining member, means for ejecting the cut ring liner from the said cutting member and depositing the same within the orifice of the alining member, mechanism for placing a can end within the orifice of the alining member and in axial alinement with said deposited ring liner, and means for placing the ring liner on to the flange of the axially alined can end.

3. An apparatus for cutting can end liners and assembling them with shouldered and flanged can ends for forming interfolded hermetic joints with can bodies, the same comprising associated alining spaced cutting members for cutting from the opposite sides of flat liner material and having relative movement for cutting from said material can end liners and leaving the cut liners within the control of one of the said cutting members, means for transferring the said cut ring liners and the cutting member controlling the same from a cutting station to a position where they are discharged from the said member into mechanism that further controls their movement while they are being deposited on to the flange of shouldered can ends, horizontally rotatable orificed means associated with said transfer means and adapted to receive the ring liner discharged from the cutting member, mechanism associated therewith for placing a shouldered flanged can end in position for axial alinement with the deposited ring liner, and devices for applying the ring liner to the flange of the axially alined can end.

4. An apparatus for the described purpose, the same comprising a horizontally rotatable transfer member and an associated horizontal rotatable orificed alining member, opposed cutting members associated with the horizontally rotatable transfer member and arranged on opposite sides of sheet liner material, one of which cutting members is movable, whereby as said cutting members are brought into alined relation a can and liner is cut from said sheet material and left within the control of one of said cutting members which said cutting member is carried by the transfer member, means for positioning liner material between the said cutting members, devices for actuating a cutting member for the severance of a gasket ring from the liner material and leaving the same within the control of one of the cutting members, means actuating the horizontally movable transfer member for carrying the mentioned cutting member with the cut ring liner to a position in axial alinement with one of the orifices of the opposing horizontally movable member, and means for ejecting the ring liner from its carrying cutting member into the alined orifice of the opposing horizontally movable member, the orifices of said alining member being provided with supports whereby the ring liners are carried separately from the can ends to a farther station.

5. An apparatus for the described purpose, the same comprising a horizontally rotatable transfer member and an associated horizontal rotatable orificed alining member, opposed cutting members associated with the horizontally rotatable carrier member and arranged on opposite sides of sheet liner material, one of which cutting members is movable, whereby as they are brought into alined relation a can and liner is cut from said sheet material and left within the control of one of said cutting members carried by the transfer member, means for positioning liner material between the said cutting members, devices for actuating a cutting member for the severance of a gasket ring from the liner material and leaving the same within the control of one of the cutting members, means for actuating the horizontally movable transfer member for carrying the mentioned cutting member with the cut ring liner to a position in axial alinement with one of the orifices of the opposing horizontally movable alining member, and means for ejecting the ring liner from said cutting member and depositing the same into the alined orifice of the alining member, mechanism for positioning a flanged can end for axial alinement with the ring liner deposited in the orifice of said members, devices for moving the ring liner from within the said orifice and depositing the same onto the flange of the can end, and mechanism for moving the said horizontally rotatable members in timed relation.

6. A machine for the described purpose, the same comprising a horizontally rotatable transfer turret, a plurality of composite cutting dies carried by said transfer member, a reciprocating cutting die co-acting successively with said composite dies for the cutting of a ring liner from flat liner material and leaving the same within the control of the composite die, a stripper associated with each composite die for ejecting the cut ring liner therefrom, a horizontally rotatable alining turret associated with the transfer turret and moving in timed relation therewith, said alining turret being provided with a series of orifices adapted for axial alinement successively with the composite cutting dies, devices for actuating the strippers of the composite dies as brought into axial alinement with the orifices of the alining turret for the removal of the cut ring liner and the deposit thereof within said orifices, mechanism for positioning flanged can ends for axial alinement with the deposited ring liners, and means for moving the ring liners from within the orifices and depositing the same onto the flange of the axially alined can ends.

7. In a machine for the described purpose, the combination with a horizontally movable transfer member, of a composite cutting die carried thereby consisting of two spaced cutting rings, a reciprocating cutting member co-acting therewith for the cutting on a single stroke from a positioned web or blank a ring liner and leaving the same within the control of the composite cutting die, a horizontally movable orificed alining member associated with the horizontally movable transfer member, mechanism for actuating the horizontally movable members in timed relation whereby the composite cutting die is placed in axial alinement with the orifice of the alining member, devices for ejecting the ring liner from the composite die and depositing the same within the orifice of the alining member, mechanism for positioning a flanged can end for axial alinement with the deposited ring liner, reciprocating means for forcing the ring liner onto the flange of the axially alined can end, and devices for ejecting the alined can end.

8. In an apparatus for the described purpose, the combination with opposed spaced cutting members arranged for axial alinement on opposite sides of flat liner material and having relative movement for the cutting of a ring liner therefrom and leaving the same within the control of one of said cutting members, a horizontally movable orificed alining member, means for transferring one of said cutting members with the cut ring liner under the control thereof from a cutting station to a position in axial alinement with the orifice of the alining member, means for ejecting the ring liner from the said cutting member and depositing the same within the orifice of the alining member, mechanism for positioning a flanged can end for axial alinement with the positioned ring liner, and devices for moving the deposited ring liner from within the orifice and applying the same to the flange of the axially alined can end.

9. In an apparatus for the described purpose, the combination with a horizontally rotatable transfer member, a plurality of composite die members carried thereby, a cutting member adapted to co-act successively with said composite die members for the cutting of a ring liner from flat liner material and leaving the same within the control of the composite die members, a horizontally rotatable orificed alining member associated with the transfer member, mechanism for actuating the transfer member and the alining member in timed relation whereby the composite die members are successively placed in axial alinement with the orifices of the alining member, means for ejecting the ring liners from the said composite die members and depositing the same successively within the orifices of the alining member, mechanism for positioning a flanged can end within the sphere of the orifices of the alining member in axial alinement with the cut ring liners, and devices for applying the ring liner to the flange of the axially alined can end.

10. The combination of two carriers intersecting at a common ring liner transferring station, the first of said carriers being provided with composite ring liner forming and carrying cutters and the second provided with orifices having ring liner supporting and carrying means, ring liner discharging means operable at said transferring station, an assembling means and station beyond said transferring station, and means for causing a can end to be in alinement with the ring liner at said assembling station.

11. The combination of two intermittently rotary carriers intersecting at a common ring liner transferring station, the first of said carriers being provided with composite ring liner forming and carrying cutters and having a cutting station in advance of said transferring station, and the second provided with orifices having ring liner supporting and carrying means and having a can end feeding station and an assembling means and station beyond said transferring station, ring liner discharging means operable at said transferring station, and means for feeding can ends at said feeding station to be in alinement with the ring liners at said assembling station.

12. The combination of two carriers intersecting at a common ring liner transferring station, the first of said carriers being provided with composite ring liner forming and carrying cutters at the under side of said first carrier and the second of said carriers being arranged below the first carrier and provided with orifices having ring liner supporting and carrying means, ring liner discharging means operable downward at said transferring station, an assembling means and station beyond said transferring station, and means for causing a can end to be in alinement with the ring liner at said assembling station.

In testimony whereof I have signed my name to this specification in the presence of two subscribing witnesses.

JAMES A. GRAY.

Witnesses:
  N. A. ACKER,
  D. B. RICHARDS.